(12) United States Patent
Serban et al.

(10) Patent No.: US 7,759,282 B2
(45) Date of Patent: Jul. 20, 2010

(54) CATALYST FOR REMOVAL OF SULFER FROM A GASEOUS STREAM

(75) Inventors: Manuela Serban, Glenview, IL (US); Lisa M. King, Lake in the Hills, IL (US); Alakananda Bhattacharyya, Glen Ellyn, IL (US); Kurt M. Vanden Bussche, Lake in the Hills, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 12/328,503

(22) Filed: Dec. 4, 2008

(65) Prior Publication Data

US 2010/0135896 A1 Jun. 3, 2010

(51) Int. Cl.
*B01J 23/00* (2006.01)

(52) U.S. Cl. ........................................ 502/335; 502/337

(58) Field of Classification Search ................. 502/335, 502/337
See application file for complete search history.

(56) References Cited

U.S. PATENT DOCUMENTS

| | | | |
|---|---|---|---|
| 2,649,166 A | 8/1953 | Porter et al. | |
| 2,863,527 A | 12/1958 | Herbert et al. | |
| 2,926,751 A | 3/1960 | Kohl et al. | |
| 3,362,133 A | 1/1968 | Kutsher et al. | |
| 3,505,784 A | 4/1970 | Hochgesand et al. | |
| 4,161,393 A * | 7/1979 | Rudolph et al. | 48/197 R |
| 4,263,020 A * | 4/1981 | Eberly, Jr. | 95/136 |
| 4,452,854 A * | 6/1984 | Merriam et al. | 423/437.2 |
| 4,456,703 A * | 6/1984 | Aldridge | 502/335 |
| 4,623,533 A * | 11/1986 | Broecker et al. | 423/224 |
| 4,690,806 A * | 9/1987 | Schorfheide | 423/230 |
| 4,908,199 A * | 3/1990 | Sauvion et al. | 423/437.2 |
| 5,045,222 A | 9/1991 | Endo et al. | |
| 5,130,288 A | 7/1992 | Delzer et al. | |
| 5,254,516 A | 10/1993 | Gupta et al. | |
| 5,281,445 A | 1/1994 | Khare | |
| 5,306,685 A | 4/1994 | Khare | |
| 5,939,353 A * | 8/1999 | Bhattacharyya et al. | 502/327 |
| 6,479,429 B1 | 11/2002 | Khare | |
| 6,693,060 B2 * | 2/2004 | Park et al. | 502/337 |
| 7,067,093 B2 | 6/2006 | Vierheilig et al. | |
| 7,270,798 B2 * | 9/2007 | Hagemeyer et al. | 423/655 |
| 7,557,063 B2 * | 7/2009 | Hagemeyer et al. | 502/335 |
| 2004/0170549 A1 | 9/2004 | Vierheilig et al. | |

\* cited by examiner

*Primary Examiner*—Cam N Nguyen
(74) *Attorney, Agent, or Firm*—Mark Goldberg

(57) ABSTRACT

The present invention involves a process and materials for simultaneous desulfurization and water gas shift of a gaseous stream comprising contacting the gas stream with a nickel aluminate catalyst. The nickel aluminate catalyst is preferably selected from the group consisting of $Ni_{2x}Al_2O_{2x+3}$, $Ni_{(2-y)}Ni^0{}_yAl_2O_{(5-y)}$, $Ni_{(4-y)}Ni^0{}_yAl_2O_{(7-y)}$, $Ni_{(6-y)}Ni^0{}_yAl_2O_{(9-y)}$, and intermediates thereof, wherein $x \geq 0.5$ and $0.01 \leq y \leq 2$. Preferably, x is between 1 and 3. More preferably, the nickel containing compound further comprises $Ni_{2x}Al_2O_{2x+3-z}S_z$ wherein $0 \leq z \leq 2x$.

3 Claims, No Drawings

CATALYST FOR REMOVAL OF SULFER FROM A GASEOUS STREAM

BACKGROUND OF THE INVENTION

This invention relates to the materials used for and process for both the removal of sulfur compounds from a gaseous stream and for the water gas shift reaction. More specifically, the invention relates to the use of a nickel containing aluminate catalyst to provide for simultaneous desulfurization and water gas shift at temperatures of about 450° C.

The gaseous stream may originate from any partial oxidation or gasification process of a carbon containing feedstock. The gaseous stream may be a fuel gas originating from an IGCC (Integrated Gasification Combined Cycle) coal gasification plant, it may be a flue gas from a fluid catalytic cracking unit (FCC), it may be a synthesis gas (syngas) from steam reforming of natural gas, certain gasification reactions or from gasification of coal. Synthesis gas is the name generally given to a gaseous mixture principally comprising carbon monoxide and hydrogen, but also possibly containing carbon dioxide and minor amounts of methane and nitrogen.

Synthesis gas is used, or is potentially useful, as feedstock in a variety of large-scale chemical processes, for example: the production of methanol, the production of gasoline boiling range hydrocarbons by the Fischer-Tropsch process and the production of ammonia.

Processes for the production of synthesis gas are well known and generally comprise steam reforming, auto-thermal reforming, non-catalytic partial oxidation of light hydrocarbons or non-catalytic partial oxidation of any hydrocarbons. Of these methods, steam reforming is generally used to produce synthesis gas for conversion into ammonia or methanol. In such a process, molecules of hydrocarbons are broken down to produce a hydrogen-rich gas stream.

Regardless of the carbon source and gasification process, the generated fuel gas has to be substantially cleaned before being either burned in a gas turbine or used for chemical synthesis, e.g., methanol, ammonia, urea production, Fischer-Tropsch synthesis. The clean-up of hot fuel gases avoids the sensible heat loss due to the cooling and subsequent reheating associated with the wet scrubbing techniques using either chemical or physical solvents. Ideally, the clean-up of the fuel gas is done at the highest temperature that the fuel gas distribution system can be designed at. This could improve greatly the overall process efficiency, however, there are significant hurdles that need to be overcome before such a hot-fuel gas clean-up system is made commercially available. Only the hot particulate removal systems, i.e., candle filters or sintered metal filters, have been successfully demonstrated commercially for long term applications in a temperature range of 200° to 250° C. at the Nuon's Shell coal gasification plant in The Netherlands, and 370° to 430° C. in the E-Gas coal/coke gasification system at the Wabash River plant. All large scale warm desulfurization demonstration units have failed mostly due to inappropriate sulfur-scavenger materials.

Both large scale warm gas desulfurization units (Piñon Pine Air-Blown IGCC and Tampa Electric Polk Power station) used Zn-based S-scavenger materials. The Pinon Pine Air-Blown and Hot Gas Cleanup IGCC using a KRW air-blown pressurized fluidized-bed coal gasification system with Southern Utah bituminous coal containing 0.5-0.9% sulfur (design coal) and Eastern bituminous coal containing 2-3% sulfur (planned test). The purpose was to demonstrate air-blown, pressurized, fluidized-bed IGCC technology incorporating hot gas cleanup (HGCU); to evaluate a low-Btu gas combustion turbine; and to assess long-term reliability, availability, maintainability, and environmental performance at a scale sufficient to determine commercial potential. Steady state operation was not reached in the course of the 42 months demo operation and the Zn-based S-scavenger material failed since it did not hold up physically in the entrained bed reactor. Zn was lost during the 538° C. reaction via volatilization. The second large scale hot gas desulfurization demo unit at Tampa Electric Polk Power station intended to clean 10% of the fuel gas by a hot-gas cleanup system developed by GE Environmental Services, Inc. The hot gas desulfurization unit was an intermittently moving bed of Zn oxide based sorbent that operated at 482° C. The demonstration again failed due to very high attrition loss (which made operation with that particular sorbent far from cost effective) and due to significant reactivity loss because of Zn sulfate formation and Zn volatilization. (References: The Piñon Pine IGCC Project, U.S. DOE and Piñon Pine Power Project Reports, December 1996; January 2001. The Tampa Electric IGCC Project, U.S. DOE and Tampa Electric Reports, October 1996; July 2000; August 2002).

Some patents that disclose the use of Zn-containing S-sorbents include several assigned to Phillips Petroleum: U.S. Pat. No. 5,045,522; U.S. Pat. No. 5,130,288; U.S. Pat. No. 5,281,445; U.S. Pat. No. 5,306,685; and U.S. Pat. No. 6,479,429. There are also several patents assigned to RTI (Research Triangle Institute): U.S. Pat. No. 5,254,516; U.S. 2004/0170549 Al; and U.S. Pat. No. 7,067,093. There is no prior disclosure of the simultaneous removal of S-compounds from a gaseous stream and the water gas shift reaction.

With the current state of development of hot gas cleanup systems, all the other contaminants besides the S-compounds and solid particulates can not be removed at equally high temperatures. Even more, due to the imminent $CO_2$ regulations, all integrated gasification combined cycle (IGCC) gasifiers will have to be equipped with at least one CO-shift reactor, requiring thus cooling the fuel gas to temperatures adequate for the water gas shift catalytic reaction. In view of these $CO_2$ regulations, the trend in the gasification industry is towards use of direct water quench gasifiers. The quench mode design significantly reduces the capital cost of syngas cooling, while heat integration maintains good overall thermal efficiency. The quench mode is advantageous for the water gas shift reaction as the raw syngas becomes saturated with steam generated by evaporation of a portion of the quench water. An entrained-flow slurry-fed gasification with direct water quenching is the preferred and commonly used option of GE Energy, and recently, Shell, Lurgi and Siemens also offer the water quenching cooling method. In addition to efficiently cooling the raw syngas and recovering part of the sensible heat, significant decontamination takes place in the quenching step. Solid particulates, alkali metals, non-volatile metals, chlorides, the bulk of metal carbonyls and part of ammonia are all removed in the water quenching step. The contaminants left in the raw syngas after the water quenching step include about 50-100 ppmv ammonia, 1 to 4 ppmv Ni and Fe carbonyls, about 50-100 ppmv HCN, Hg, As, and sulfur-containing gases, i.e., $H_2S$ and COS. All these contaminants must be removed before the syngas is either burned in a gas turbine or used for chemical synthesis.

This invention discloses a class of materials able to simultaneously completely desulfurize (remove $H_2S$ and COS) a fuel gas originating from a gasification process and shift the CO to $CO_2$ in a temperature range of 250° to 550° C. The $CO_2$ stream can be further shifted by adding an additional sweet CO-shift unit downstream of this integrated desulfurization and CO-shift unit. Thus, the hydrogen production is maximized and the clean, concentrated $CO_2$ stream can be captured using either a physical solvent process, e.g., UOP's Selexol process, or alternatively using high temperature $CO_2$ absorbents. This integrated desulfurization and CO-shift concept represents the next generation of synthesis gas treating. Currently, regenerable solvent-type acid gas removal processes are used in both IGCCs and chemical synthesis applications, e.g., UOP's Selexol process (U.S. Pat. No. 2,649,166 and U.S. Pat. No. 3,363,133) or Linde Engineering's Rectisol process (U.S. 2,863,527). Unfortunately, these processes require cooling the fuel gas to low temperatures and then subsequently reheating it to temperatures adequate to its downstream use. This issue associated with the solvent scrubbing based clean-up processes can be addressed by using the concept disclosed in this invention. This invention relates to the use of a nickel containing aluminate catalyst to provide for simultaneous desulfurization and water gas shift at temperatures of about 450° C. The $CO_2$ stream can be further concentrated (complete CO-shift) by adding an additional sweet CO-shift unit downstream of this integrated unit. Thus, the hydrogen production is maximized and the clean, concentrated $CO_2$ stream can be captured using either a physical solvent process, or alternatively using high temperature $CO_2$ absorbents. There are several main advantages associated with this concept: by continuously removing the H2S from the gaseous stream, the COS hydrolysis equilibrium is shifted completely to the right, the $CO_2$ stream is concentrated via the water gas shift reaction, and also possibly the equipment costs could be greatly reduced.

SUMMARY OF THE INVENTION

The present invention involves a process for simultaneous desulfurization and gas shift of a gaseous stream comprising contacting the gaseous stream with a nickel aluminate catalyst. The nickel aluminate catalyst is preferably selected from the group consisting of $Ni_{2x}Al_2O_{2x+3}$, $Ni_{(2-y)}Ni^0{}_yAl_2O_{(5-y)}$, $Ni_{(4-y)}Ni^0{}_yAl_2O_{(7-y)}$, $Ni_{(6-y)}Ni^0{}_yAl_2O_{(9-y)}$, and intermediates thereof, wherein $x \geq 0.5$ and $0.01 \leq y \leq 2$. Preferably, x is between 1 and 3. More preferably, the nickel containing compound further comprises $Ni_{2x}Al_2O_{2x+3-z}S_z$ wherein $0 \leq z \leq 2x$. The nickel containing compound reacts with more than 10% of sulfur compounds within the gaseous stream. Preferably, the nickel containing compound reacts with more than 50% of the sulfur compounds within the gaseous stream. At least 10% of the carbon monoxide within the gaseous stream is converted to carbon dioxide. The nickel containing compound contacts the gaseous stream at a temperature from about 250° to 550° C. Preferably the temperature is from 400° to 500° C. and the pressure is from about 10 to 80 bar. The GHSV (at STP) is preferably higher than 500 m³/m³/hr. Steam and CO are present at a molar ratio from about 0.5:1 to 4:1 and preferably at a molar ratio from about 1.5:1 to 3.5:1.

The gaseous stream is produced by gasification of hydrocarbons, including fuel gas and syngas.

The invention also involves the use of this catalyst in the treatment of fuel gas comprising carbon monoxide, hydrogen, carbon dioxide, sulfur compounds and various impurities.

DETAILED DESCRIPTION OF THE INVENTION

We disclose here a class of materials able to desulfurize (H₂S and COS complete removal) fuel gases and simultaneously shift CO to $CO_2$. The class of materials consists of nickel aluminates prepared from hydrotalcite as the starting material. The nickel aluminate catalyst is preferably selected from the group consisting of $Ni_{2x}Al_2O_{2x+3}$, $Ni_{(2-y)}Ni^0{}_yAl_2O_{(5-y)}$, $Ni_{(4-y)}Ni^0{}_yAl_2O_{(7-y)}$, $Ni_{(6-y)}Ni^0{}_yAl_2O_{(9-y)}$, and intermediates thereof, wherein $x \geq 0.5$ and $0.01 \leq y \leq 2$. Preferably, x is between 1 and 3. More preferably, the nickel containing compound further comprises $Ni_{2x}Al_2O_{2x+3-z}S_z$, wherein $0 \leq z \leq 2x$. An Ni aluminate material (Ni 4.09: $Al_2O$ 7.09: 2.4 $H_2O$) was shown to have excellent S absorption capacity, i.e., 10 wt-% S before pre-breakthrough, and simultaneously achieve 40-50% CO conversion to $CO_2$. The materials are regenerable.

In addition, herein we disclose a class of materials used for and a process used for the complete hydrolysis and hydrogenation of COS to $H_2S$ in a sulfur containing gaseous stream, said materials and process used for the complete removal of said $H_2S$ from said gaseous stream and said materials and process for shifting CO to $CO_2$. The nickel aluminate catalyst is preferably selected from the group consisting of $Ni_{2x}Al_2O_{2x+3}$, $Ni_{(2-y)}Ni^0{}_yAl_2O_{(5-y)}$, $Ni_{(4-y)}Ni^0{}_yAl_2O_{(7-y)}$, $Ni_{(6-y)}Ni^0{}_yAl_2O_{(9-y)}$, and intermediates thereof, wherein $x \geq 0.5$ and $0.01 \leq y \leq 2$. Preferably, x is between 1 and 3. More preferably, the nickel containing compound further comprises $Ni_{2x}Al_2O_{2x+3-z}$ wherein $0 \leq z \leq 2x$.

EXAMPLE 1

An Ni aluminate material with the final formula $Ni_{4.09}Al_2O_{7.09}$: 2.4 $H_2O$ was prepared via a Layered Double Hydroxide (LDH) Metal Oxide Solid Solution (MOSS) route. In this procedure, a clear solution was prepared by combining 328.0 g of 50% aqueous NaOH with 1170.0 g DI water, followed by the addition of 136.1 g of $NaCO_3:H_2O$. A second solution was prepared by dissolving 345.3 g $Ni(NO_3)_2:6H_2O$ and 217.7 g $Al(NO_3)_3:9H_2O$ into 840.0 g DI water. The aqueous metal nitrate solution was then added to the first solution dropwise while stirring over a 2 hour period. The reaction mixture was heated to 80° C. and held at temperature for 16 to 18 hours while stirring. The solids were then isolated by vacuum filtration and washed vigorously with DI water (26 liters) and dried in ambient air. At this point, XRD confirmed the synthesis of Ni-Al-O Layered Double Hydroxide material which was then calcined (in flowing air) for 6 hours at 450° C. followed by 4 hours at 550° C. to generate the metal oxide solid solution. The resulting material contained 58.5 wt-% Ni, had a surface area of 189 m²/g, pore volume=0.337 cm³/g and pore diameter =71 Å.

EXAMPLE 2

The sulfidation/CO-shift experiments were done with the $Ni_{4.09}Al_2O_{7.09}$:2.4 $H_2O$ material prepared in Example 1 at atmospheric pressure, 450° C. with a gas simulating an oxygen blown gasifier containing 1.1% $H_2S$+0.0763% COS+ 45% $H_2$+46% CO+7.2% $CO_2$+0.7% $CH_4$. Steam had been co-fed in a steam:CO molar ratio 3.5:1. The wet basis GHSV was 2100 h⁻¹. The oxidative regeneration was done with 2% $O_2$ in $N_2$ at 500° C. and GHSV=2100 h⁻¹. In the very first cycle, the S absorption capacity before S-breakthrough was 10 wt-% S and the CO conversion was about 95% to both $CO_2$ and $CH_4$. The Ni aluminate generated about 10% $CH_4$ which represents about 60% of the equilibrium methane formation. The sample had been heated to the reaction temperature under a $H_2$ atmosphere, such that some of the Ni present in the Ni aluminate material had been reduced to the metallic state thus creating the active sites for the methanation reaction. After a 500° C. oxidation cycle, when no Ni which promotes the methanation reaction is present in the nickel aluminate material, no $CH_4$ formation was observed. The CO conversion to $CO_2$ was about 50%. However, the S absorption capacity before S-breakthrough was still 10 wt-% S. Methane formation is undesirable since it contributes to the non-captured carbon inventory; however, as it will be shown below, the yield to methane in all subsequent cycles is zero.

In the first cycle, the amount of methane formed decreased continuously as the Ni metal was progressively being sulfided. Without wanting to be bound by any theory, we believe that the S-compounds present in the feed inhibit the methanation reaction since they adsorb on the same sites, i.e., $Ni^0$, as $H_2$ would otherwise adsorb reducing thus the hydrogenation activity. Sulfur poisons the ability of Ni-catalysts to hydrogenate the carbon atom much more severely than the ability to form carbon-carbon bonds. However, since the feed contains a large amount of steam, the C-C bond formation is also inhibited, such that the only reaction that takes place involving the C-containing compounds is the water gas shift reaction. The materials were regenerated via oxidative regeneration at 500° C. under 2% $O_2$ in $N_2$. Only sulfur dioxide was detected during the oxidation step.

In the second cycle, after a 500° C. oxidative regeneration, the material recovered completely the S-absorption capacity but recovered only about 42% of the CO conversion activity. No $CH_4$ was formed in the second cycle. The methane formation is completely inhibited due to the absence of $Ni^0$ and also probably due to a S poisoning effect by the 0.5 to 1.5 wt-% residual S left behind after the regeneration step. The presence of the residual S was confirmed via the S-XRF analysis of the KOH scrubbing solution and by XAFS analysis. As indicated before, sulfur adsorbs strongly on the sites that $H_2$ would otherwise adsorb reducing thus the hydrogenation activity of the catalyst. The fact that the residual S (from a previous sulfidation cycle) might poison the sites responsible for methanation is indicated by the complete inhibition of $CH_4$ formation, but similar CO-shift to $CO_2$ conversion during the second sulfidation cycle after an oxidative regeneration followed by a $H_2$ pretreatment step. One would expect that a $H_2$ treatment would reduce some nickel to $Ni^0$ creating thus the active sites for methanation. However, the methane yield is zero while the CO-shift conversion to $CO_2$ is similar to the conversion achieved in the absence of such a pre-reduction step. This indicates that the sites responsible for methanation ($Ni^0$) are poisoned by sulfur while the Ni oxide (generated after the oxidation cycle) sites are available for both CO-shift and S uptake. In the second cycle, the S uptake before pre-breakthrough was 10wt-% S. The CO to $CO_2$ shift activity of the Ni material remains constant, at about 40-50% CO conversion to $CO_2$ even after the material is sulfided. Nickel sulfide is known to be a sour CO-shift catalyst.

Another reason for the decreased CO-shift activity could be the physical change occurring in the MOSS material after sulfidation-oxidation treatments. After two oxidation cycles however, the material lost about 50% of its surface area (Table 1), suggesting that some MOSS structure might have collapsed. The narrow NiO peaks identified via XRD suggest that possibly some metal might have migrated creating larger sintered metal oxide crystallites. The fresh MOSS material calcined at 450° C. has the same surface area as the fresh material calcined at 550° C., suggesting that the heat treatment alone does not destroy the MOSS structure, but the sulfidation-oxidation treatments promote some surface area loss and surface roughening.

TABLE 1

Surface area, pore volume and pore diameter for the Ni Aluminate material exposed to different temperatures and atmospheres

| Material | SA ($m^2/g$) | PV ($cm^3/g$) | PD (Å) |
|---|---|---|---|
| Fresh Ni Aluminate Calcined at 450° C. | 189 | 0.337 | 71 |
| Fresh Ni Aluminate Calcined at 550° C. | 184 | 0.355 | 77 |
| Fresh Ni Aluminate - pretreated in H2 at 450° C. | 153 | 0.316 | 83 |
| 2 Cycles Sulfided/Oxidized | 95 | 0.29 | 124 |

Table 2 summarizes the Ni aluminate performance for desulfurization and CO-shift. The yields to $CO_2$ and $CH_4$ were calculated according to the equations:

$$Y_{CO_2} = \frac{\%_{CO_2}^{out} - \%_{CO_2}^{in}}{\%_{CO}^{in}}$$

and $$Y_{CH_4} = \frac{\%_{CH_4}^{out} - \%_{CH_4}^{in}}{\%_{CO}^{in} + \%_{CO_2}^{in}}$$

where: $X_{CO}$=carbon monoxide conversion (%); $Y_{CO2}$=yield to carbon dioxide (%); $Y_{CH4}$=yield to methane (%); $\%_{(CO2, CO, CH4)}^{in}$ refers to the volume % of $CO_2$, CO or $CH_4$ in the feed gas and $\%_{(CO2, CO, CH4)}^{out}$ refers to the volume % of $CO_2$, CO or $CH_4$ in the exhaust gas.

TABLE 2

Performance of the Ni aluminate (Ni/Al = 2) for warm gas desulfurization and CO conversion

| Material | Sulfidation Cycle | Minutes on stream wt. no S | Wt % S (up to break-through) | $X_{CO}$ (%) | $Y_{CO2}$ (%) | $Y_{CH4}$ (%) |
|---|---|---|---|---|---|---|
| Ni/Al = 2 | 1 | 280 | 10 | 96 → 66 | 84 → 63 | 17 → 12 |
| | 2 | 280 | 10 | 45 | 30 | 0 |
| | 1 | 280 | 10 | 45 | 30 | 0 |
| | After an oxidation cycle | | | | | |
| | 2 | 280 | 10 | 45 | 30 | 0 |

EXAMPLE 3

Comparative Example

A sample of Ni loaded alumina was prepared by standard impregnation technique. A solution containing 14.83 g of Ni(NO3)3:6H2O dissolved into 30 DI H2O was prepared. To this solution, 10.7 g of R-50/R51 gamma alumina extrudates were added while stirring gently. Stirring at room temperature was continued for 20 hours after which the solution was evaporated with occasional stirring in an 80° C. forced air oven to yield dry solids. The resultant dried solids were then calcined in flowing air with 3° C./min heating rate to 550° C. and held at temperature for 6 hours. The resultant product was measured by ICP to contain 38.3% Al, 21.1% Ni with an LOI at 900° C.=12.84% giving a final product formula of $Ni_{0.51}Al_2O_{3.51}$:1.0 $H_2O$. $N_2$ BET surface area was measured at 163 $m^2/g$ with a pore volume=0.361 cc/g. This finished material was identified by XRD analysis to contain NiO and gamma alumina. The NiO on gamma-alumina was tested under the conditions described in Example 2. While the CO conversion to $CO_2$ was similar to the Ni aluminate material, however, the S absorption capacity before S-breakthrough was only 3.9 wt-% S.

TABLE 3

Performance of the Ni impregnated on alumina catalyst for warm gas desulfurization and CO conversion

| Material | Sulfidation Cycle | Minutes on stream wt. no S | Wt-% S (up to break-through) | $X_{CO}$ (%) | $Y_{CO2}$ (%) | $Y_{CH4}$ (%) |
|---|---|---|---|---|---|---|
| 30% Ni impregnated on Al2O3 | 1 | 75 | 3.9 | 50 | 25 | 1.5 |

The invention claimed is:

1. A catalyst for removal of sulfur from a gaseous stream, said catalyst comprising a nickel containing compound selected from the group consisting of $Ni_{2x}Al_2O_{2x+3}$, $Ni_{(2-y)}Ni^0{}_yAl_2O_{(5-y)}$, $Ni_{(4-y)}Ni^0{}_yAl_2O_{(7-y)}$, $Ni_{(6-y)}Ni^0{}_yAl_2O_{(9-y)}$, and intermediates thereof, wherein $x \geqq 0.5$ and $0.01 \leqq y \leqq 2$ wherein said catalyst is characterized by simultaneously removing said sulfur from said gaseous stream and causing the catalysis of a water gas shift reaction.

2. The catalyst of claim 1 wherein $1 \leqq x \leqq 3$.

3. The catalyst of claim 2 wherein the nickel containing compound further comprises $Ni_{2x}Al_2O_{2x+3-z}S_z$ wherein $0 \leqq z \leqq 2x$.

* * * * *